US012298976B2

(12) United States Patent
Dong et al.

(10) Patent No.: US 12,298,976 B2
(45) Date of Patent: *May 13, 2025

(54) SYSTEM AND METHOD FOR PROVIDING CROSS-MICROSERVICE QUERY OPTIMIZATION

(71) Applicant: Oracle International Corporation, Redwood Shores, CA (US)

(72) Inventors: Ning Dong, Fremont, CA (US); Kenichi Mizuta, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,573

(22) Filed: Dec. 29, 2023

(65) Prior Publication Data

US 2024/0134855 A1     Apr. 25, 2024

Related U.S. Application Data

(63) Continuation of application No. 17/525,653, filed on Nov. 12, 2021, now Pat. No. 11,893,019.

(51) Int. Cl.
*G06F 16/2453* (2019.01)
*G06F 16/2455* (2019.01)
(Continued)

(52) U.S. Cl.
CPC .... *G06F 16/24544* (2019.01); *G06F 16/2456* (2019.01); *G06F 16/2471* (2019.01); *G06F 16/256* (2019.01)

(58) Field of Classification Search
CPC ........... G06F 16/24544; G06F 16/2456; G06F 16/2471; G06F 16/256
See application file for complete search history.

(56) References Cited

U.S. PATENT DOCUMENTS 10,798,165 B2   10/2020   Srinivasan
10,908,970 B1   2/2021   Arivazhagan
(Continued)

OTHER PUBLICATIONS

United States Patent and Trademark Office, Notice of Allowance and Fee(s) Due dated Sep. 19, 2023 for U.S. Appl. No. 17/525,653, 10 pages.

(Continued)

*Primary Examiner* — Dangelino N Gortayo
(74) *Attorney, Agent, or Firm* — TUCKER ELLIS LLP

(57) ABSTRACT

In accordance with an embodiment, described herein is a system and method for providing cross-microservice query processing. The system provides an object service framework that supports the use of microservices that may be loosely-coupled but related in some way, for example in that they interoperate together or require access to each other's data in order to process queries. Each microservice can be developed, deployed and evolve independently, and interact with the other microservices through contracts or interfaces that are defined as public APIs and are then exposed via the framework. The object service framework can be used, for example to provide a cross-microservice layer that automatically transforms queries that join objects in different microservices into a single database query that is optimized for use with the database.

20 Claims, 15 Drawing Sheets

(51) Int. Cl.
*G06F 16/2458* (2019.01)
*G06F 16/25* (2019.01)

(56) References Cited

U.S. PATENT DOCUMENTS

| | | | |
|---|---|---|---|
| 10,963,316 B2 | 3/2021 | Gopalan | |
| 11,171,845 B2 | 11/2021 | Papacica | |
| 11,321,322 B2 | 5/2022 | Liu | |
| 11,379,419 B2 | 7/2022 | Banerjee | |
| 11,442,906 B2 | 9/2022 | Viswanathan | |
| 11,893,019 B2 | 2/2024 | Dong | |
| 2019/0158594 A1* | 5/2019 | Shadmon | H04L 67/01 |
| 2019/0278570 A1 | 9/2019 | De Smet | |
| 2019/0306237 A1 | 10/2019 | Srinivasan | |
| 2019/0340168 A1* | 11/2019 | Raman | H04L 67/1008 |
| 2020/0177476 A1 | 6/2020 | Agarwal | |
| 2020/0310888 A1 | 10/2020 | Gopalan | |
| 2021/0165763 A1 | 6/2021 | Banerjee | |
| 2021/0211363 A1 | 7/2021 | Papacica | |
| 2021/0271649 A1* | 9/2021 | Narayanaswami | G06F 21/6254 |
| 2021/0303577 A1 | 9/2021 | Liu | |
| 2022/0021711 A1* | 1/2022 | Marsh | H04L 9/3247 |
| 2022/0245099 A1 | 8/2022 | Viswanathan | |
| 2022/0351260 A1* | 11/2022 | Ee | G06F 16/2462 |
| 2023/0153304 A1 | 5/2023 | Dong | |

OTHER PUBLICATIONS

United States Patent and Trademark Office, Office Communication dated Dec. 15, 2022 for U.S. Appl. No. 17/525,653 , 14 pages.

European Patent Office, International Searching Authority, Notification of Transmittal of the International Search Report and the Written Opinion of the International Searching Authority, or the Declaration dated Jul. 19, 2022 for International Application No. PCT/US2021/064528 , 14 pages.

European Patent Office, Communication pursuant to Rules 161(1) and 162 EPC dated Jun. 19, 2024 for European Patent Application No. 21844883.5 , 3 pages.

European Patent Office, International Preliminary Report on Patentability dated May 2, 2024 for European Patent Application No. 21844883.5 , 10 pages.

* cited by examiner

SYSTEM AND METHOD FOR PROVIDING CROSS-MICROSERVICE QUERY OPTIMIZATION

CLAIM OF PRIORITY

This application is a continuation of U.S. patent application titled "SYSTEM AND METHOD FOR PROVIDING CROSS-MICROSERVICE QUERY OPTIMIZATION", application Ser. No. 17/525,653, filed on Nov. 12, 2021; which application and the contents thereof are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments described herein are generally related to cloud computing environments, cloud services, and microservices, and are particularly directed to a system and method for providing cross-microservice query processing.

BACKGROUND

To address fast-changing software requirements, enterprises are increasingly looking to technologies such as microservices to provide software applications that can be rapidly developed and deployed, are easy to maintain, and can be made highly-available.

In a microservices-oriented architecture, each microservice can operate relatively independently, including having its own data model and managing its own data; with internal operations accessible to external entities only via public interfaces.

However, when used with complex software applications that interoperate together or share data, such as enterprise applications, there is a particular challenge in managing dependencies among microservices, wherein for example one microservice may need to receive data from one or more other microservices, in order to function properly.

SUMMARY

In accordance with an embodiment, described herein is a system and method for providing cross-microservice query processing. The system provides an object service framework that supports the use of microservices that may be loosely-coupled but related in some way, for example in that they interoperate together or require access to each other's data in order to process queries. Each microservice can be developed, deployed and evolve independently, and interact with the other microservices through contracts or interfaces that are defined as public APIs and are then exposed via the framework. The object service framework can be used, for example to provide a cross-microservice layer that automatically transforms queries that join objects in different microservices into a single database query that is optimized for use with the database.

DETAILED DESCRIPTION

Figure 1:
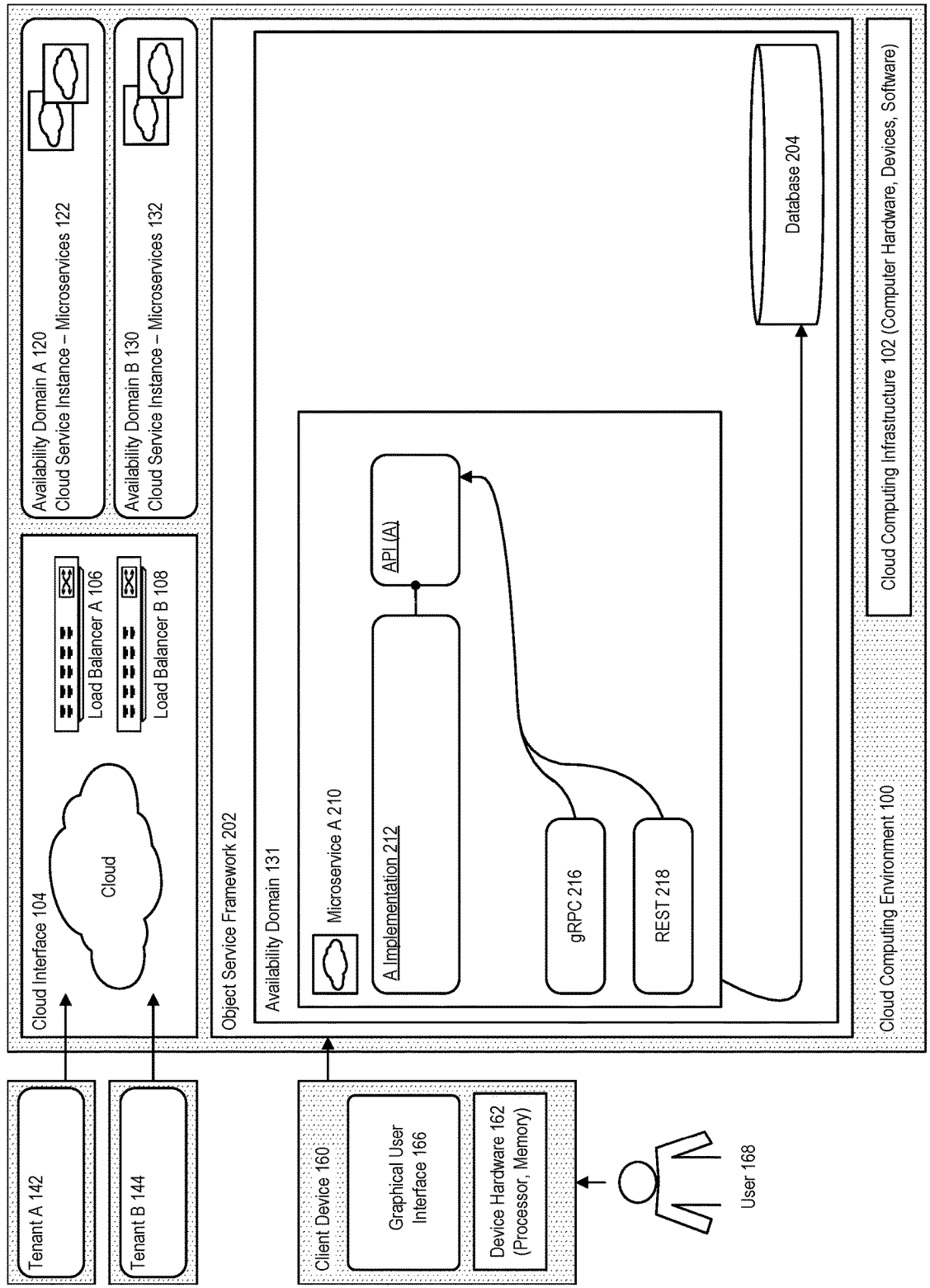
FIG. 1 illustrates a system for providing cross-microservice query processing in accordance with an embodiment.

To address fast-changing software requirements, enterprises are increasingly looking to technologies such as microservices to provide software applications that can be rapidly developed and deployed, are easy to maintain, and can be made highly-available.

In a microservices-oriented architecture, each microservice can operate relatively independently, including having its own data model and managing its own data; with internal operations accessible to external entities only via public interfaces.

However, when used with complex software applications that interoperate together or share data, such as enterprise applications, there is a particular challenge in managing dependencies among microservices, wherein for example one microservice may need to receive data from one or more other microservices, in order to function properly.

For example, within a sales-oriented enterprise application, sales orders may be managed by a first microservice, and products managed by a second microservice. The sales orders microservice may need the products data in order to properly perform its validation logic, which may necessitate joining queries for data across the different microservices, for example to obtain sale orders for products supplied by particular vendors.

In the above example, since the corresponding data objects that are owned by the different microservices may be managed within their own separate databases, it can be challenging to how to perform such queries in an optimized manner, without sacrificing the benefits offered by the microservices architecture.

In accordance with an embodiment, described herein is a system and method for providing cross-microservice query processing. The system provides an object service framework that supports the use of microservices that may be loosely-coupled but related in some way, for example in that they interoperate together or require access to each other's data in order to process queries. Each microservice can be developed, deployed and evolve independently, and interact with the other microservices through contracts or interfaces that are defined as public APIs and are then exposed via the framework.

In accordance with an embodiment, the object service framework can be used, for example to provide a cross-microservice layer that automatically transforms queries that join objects in different microservices into a single database query that is optimized for use with the database.

In accordance with an embodiment, the described approach retains the benefits offered by a microservice architecture, for example that the microservices can be rapidly developed and can operate relatively independently; while providing support for features such as joined query performance utilizing available database (e.g., SQL) optimizations.

In accordance with various embodiments, various technical features and advantages of the systems and methods described herein can include, for example:

In accordance with an embodiment, the object service framework can be used to manage multiple related microservices to ease the work of microservice development and deployment. Each microservice owner is responsible for defining its own objects, application logic, and database artifacts. Common tasks can be provided by the object service framework, for example in providing stateless APIs accessible to external systems as a managed cloud service.

In accordance with an embodiment, the uniform management of objects owned by the various microservices can be used to guide developers and users to develop a cloud-native mindset. Since each object can be associated with an internal implementation, and a public contract definition, this encourages the components to be maintained in a backward-compatible manner.

In accordance with an embodiment, the public contracts of the microservice objects can be exposed to consumers in a consistent manner. Since the object service framework manages the definitions of the objects, it can expose the public contract in various forms, for example as OpenAPI, or graphQL schemas. The object definitions serve as a repository for discovery and documentation purposes, and can be leveraged by tools such as object catalogs.

In accordance with an embodiment, the described approach provides a boundary for the microservices at the infrastructure level. Each microservice interacts with the database and other microservices through the object service framework; while the object service framework provides common APIs for each object to implement its business logic.

In accordance with an embodiment, the described approach enables leveraging a single database cluster by multiple microservices. Since all interactions are performed via the object service framework, which ensures each microservice boundary, multiple microservices can leverage a single database cluster that is easier to maintain and backup/restore, reduces operation cost, and simplifies the transition from an existing monolith system to a microservices architecture.

In accordance with an embodiment, the described approach can be used to perform query optimization automatically. Since the object service framework manages the object definition and its interaction with other microservices and outside system, it can add optimizations that involve multiple microservices. For example, in a join query case where objects in different microservices are involved but share a same database instance, the object service framework identifies which database objects are involved, and can turn the joined query into a single database SQL query, so that the joined queries can be served in an optimized manner transparent to the microservice owner. Additionally, since the microservice continues to have its own database instance, there is no need to rewrite its object code to take advantage of the optimization; instead the infrastructure will simply transform the joined query differently.

Cross-Microservice Queries

As described above, when used with complex software applications that interoperate together or share data, such as enterprise applications, there is a particular challenge in managing dependencies among microservices, wherein for example one microservice may need to receive data from one or more other microservices, in order to function properly.

Various approaches to this challenge include data replication and data mashup. With data replication, a microservice replicates the data owned by other microservices locally, so that such a join can be turned into a more performant local database join. However, this approach incurs the maintenance cost of replicating the data, and replicated data can be out of sync so the queried result can be incorrect.

With data mashup, multiple separate queries might be issued against each involved microservice, and then possible post processing is needed to join the queried result together outside database. However, the data set fetched from each microservice can be very large, and the mashup join can also be very inefficient.

In accordance with an embodiment, described herein is a system and method for providing cross-microservice query processing. The system provides an object service framework, accessible as a cloud service that supports the use of loosely-coupled but related microservices. Each microservice can be deployed and evolve independently, and only interact with the other microservices through contracts or interfaces that are defined as public APIs and are then exposed via the framework. The framework can be used, for example to provide a cross-microservice layer that automatically transforms queries that join objects in different microservices into a single database query that is optimized for use with the database.

FIG. 1 illustrates a system for providing cross-microservice query processing in accordance with an embodiment.

In accordance with an embodiment, the components and processes illustrated in FIG. 1, and as further described herein with regard to various embodiments, can be provided as software or program code executable by a computer system or other type of processing device.

For example, in accordance with an embodiment, the components and processes described herein can be provided by a cloud computing system, or other suitably-programmed computer system.

As illustrated in FIG. 1, in accordance with an embodiment, a cloud computing environment 100 can operate on a cloud computing infrastructure 102 comprising hardware (e.g., processor, memory), and software resources, and further comprising, for example, one or more cloud interfaces 104 or other application program interfaces (API) that provide access to the shared cloud infrastructure resources via one or more load balancers A 106, B 108.

In accordance with an embodiment, an availability domain 131 can include or provide access to one or more cloud service instances or microservices.

For example, in accordance with an embodiment, requests for data can be received at one or more availability domains A 120, B 130, for processing by microservices therein 122, 132. Cloud tenants A 142, B 144 can be provided with a partition within the cloud infrastructure environment within which the tenant can access their cloud resources.

In accordance with an embodiment, a client device, such as, for example, a computing device 160 having a device hardware 162 (e.g., processor, memory), and graphical user interface 166, can enable a user 168 or administrator to communicate with the cloud computing environment via a network such as, for example, a wide area network, local area network, or the Internet, to create or update cloud services.

In accordance with an embodiment, an object service framework 202, accessible as a cloud service, supports the use of loosely-coupled but related microservices. Each microservice (for example, microservice A 210) can be deployed and evolve independently, including a microservice implementation 212, and can expose one or more APIs (for example, via REST 218 and gRPC 216) that allow microservice lifecycle operations, for example to create/update artifacts in a database 204 or storage service.

Figure 2:
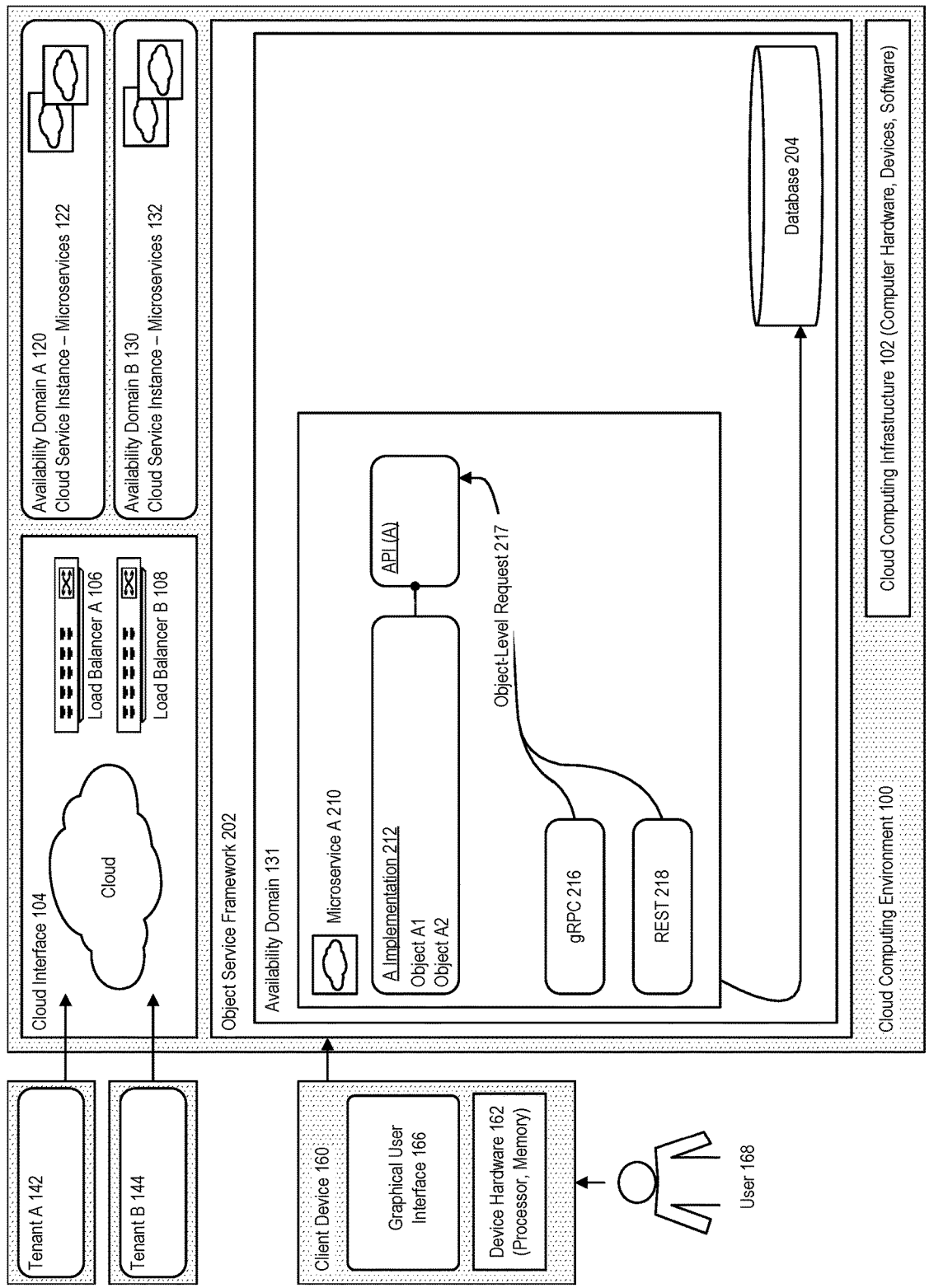
FIG. 2 further illustrates a system for providing cross-microservice query processing in accordance with an embodiment.

FIG. 2 further illustrates a system for providing cross-microservice query processing in accordance with an embodiment.

As illustrated in FIG. 2, in accordance with an embodiment, a microservice implementation can include one or more microservice objects A1, A2, or (logical, business) objects, that provide the logic or functionality of the microservice.

Figure 3:
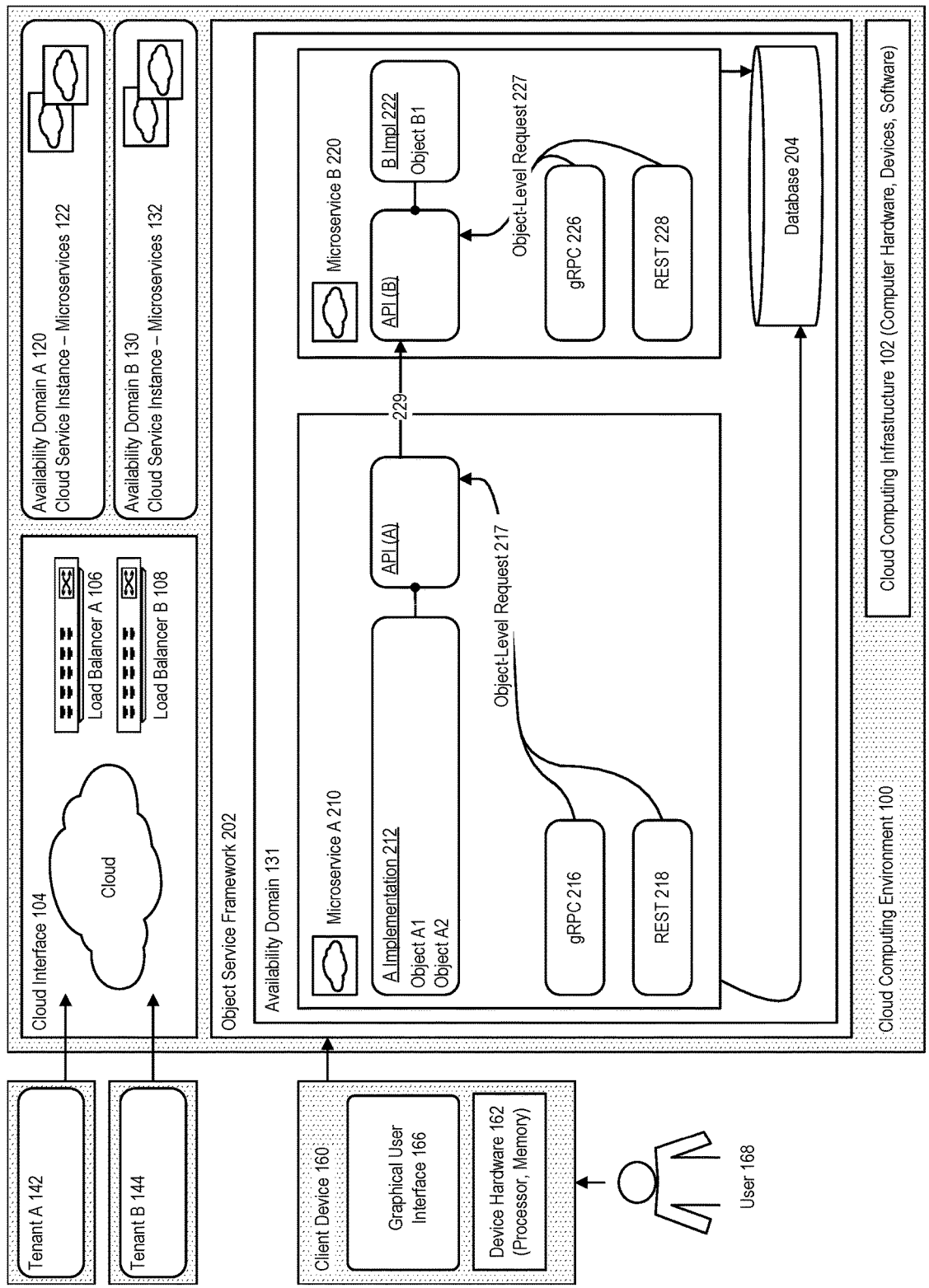
FIG. 3 further illustrates a system for providing cross-microservice query processing in accordance with an embodiment.
Figure 4:
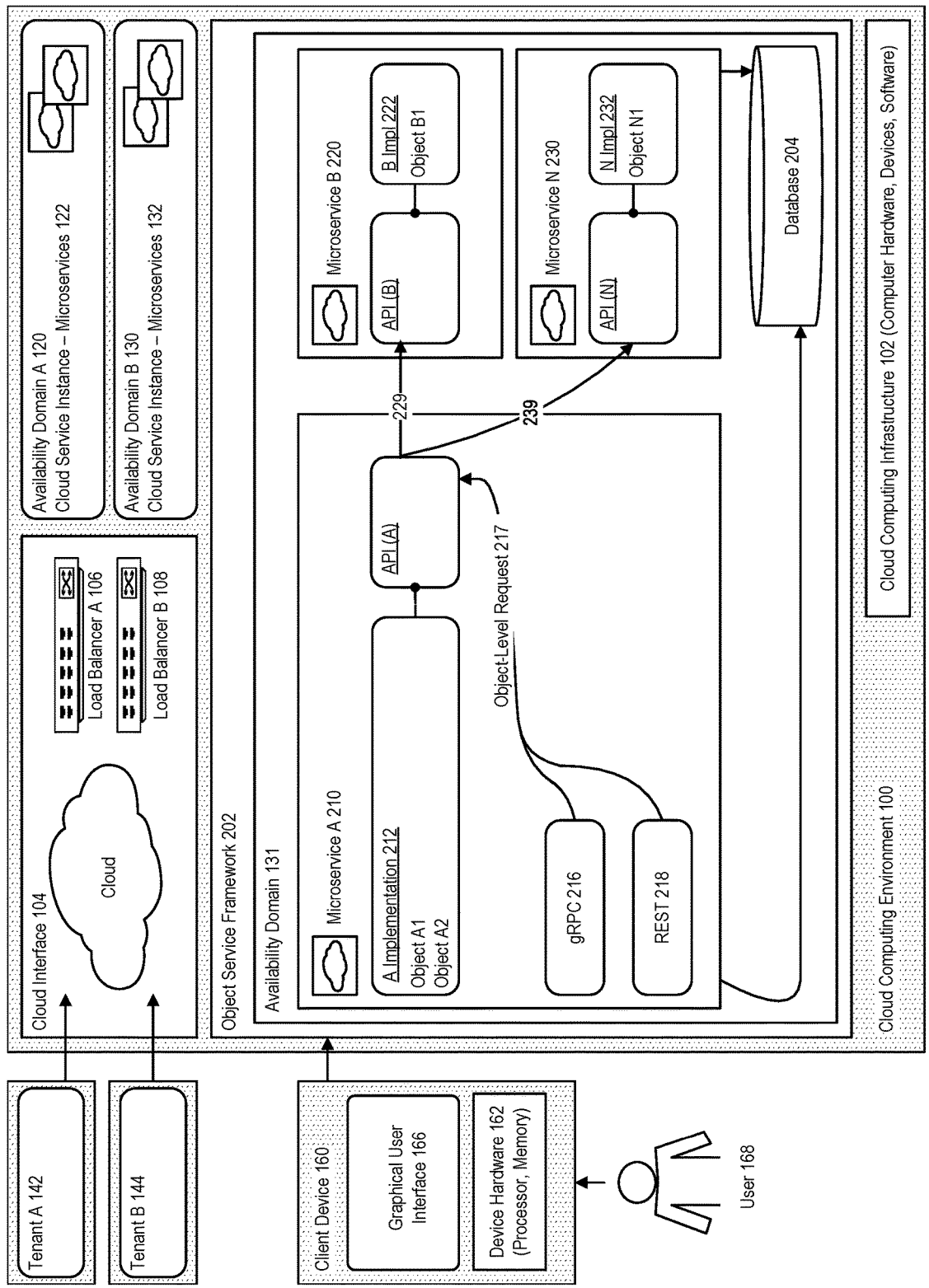
FIG. 4 further illustrates a system for providing cross-microservice query processing in accordance with an embodiment.

FIGS. 3 and 4 further illustrates a system for providing cross-microservice query processing in accordance with an embodiment.

As illustrated in FIGS. 3 and 4, in accordance with an embodiment, each other microservice (for example, microservice B 220, N 230) can be similarly deployed and evolve independently, including having their own microservice implementations 222, 232, that are exposed via REST 228 and gRPC 226) and accessing artifacts in the database. Particular microservices may be loosely-coupled but related in some way, for example in that they interoperate together or require access 229, 239 to each other's data in order to process (logical, business) object-level requests 217, 227 or queries.

Figure 5:
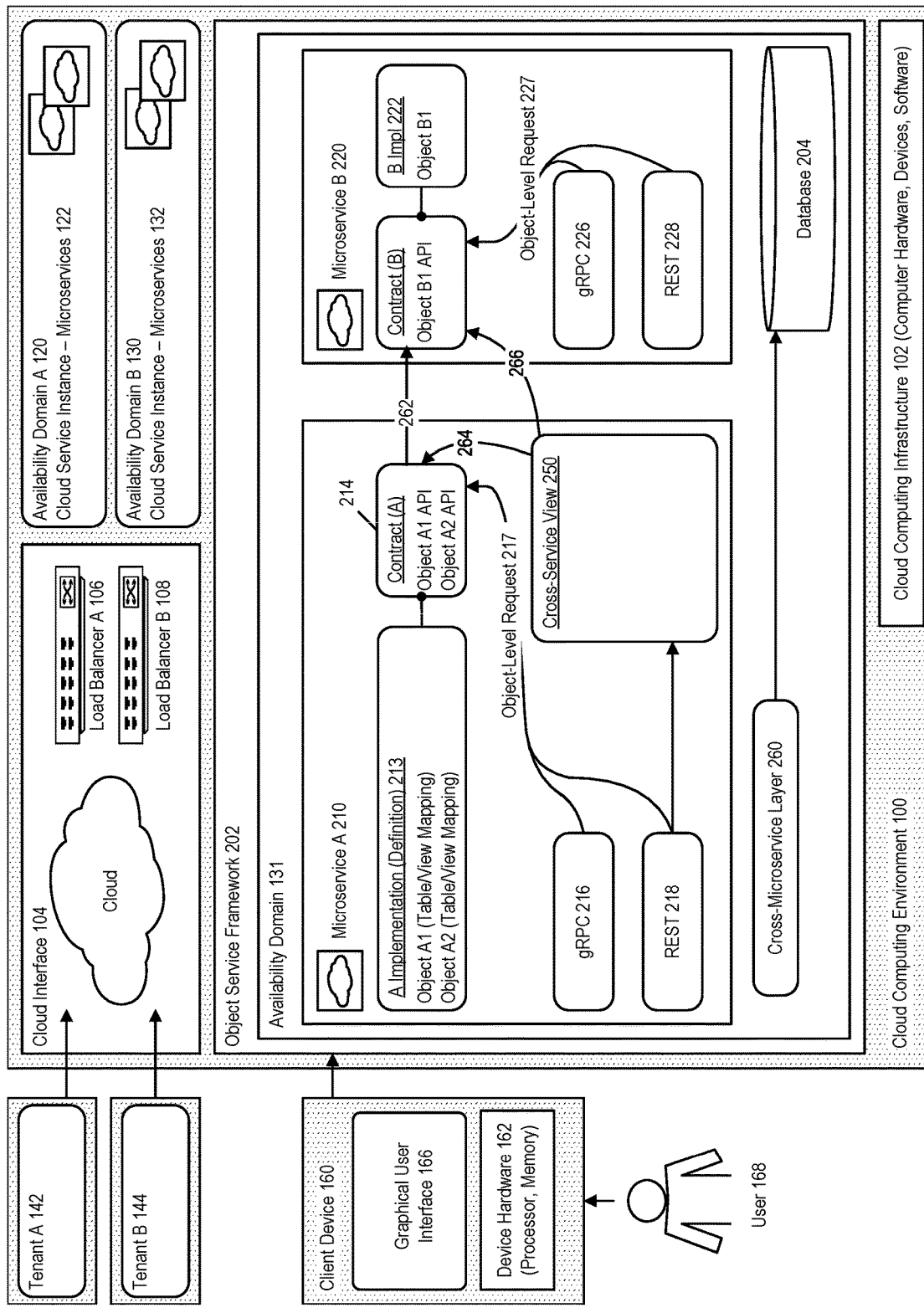
FIG. 5 further illustrates a system for providing cross-microservice query processing in accordance with an embodiment.

FIG. 5 further illustrates a system for providing cross-microservice query processing in accordance with an embodiment.

As illustrated in FIG. 5, in accordance with an embodiment, each microservice object is associated with a metadata that provides (a) an internal implementation definition 213; and (b) a public contract definition 214; wherein the public contract definition includes the properties and actions of the microservice object that will be accessible by external systems. For each microservice, the implementation definition provides a mapping between the microservice object with its properties, and a database table/view including, for example, tables, columns, and where appropriate other validation or derivation business logic.

In accordance with an embodiment, the public properties and actions defined by each microservice's public contract definition are made accessible to the external systems via public APIs and protocols such as, for example, REST, and gRPC.

Figure 6:
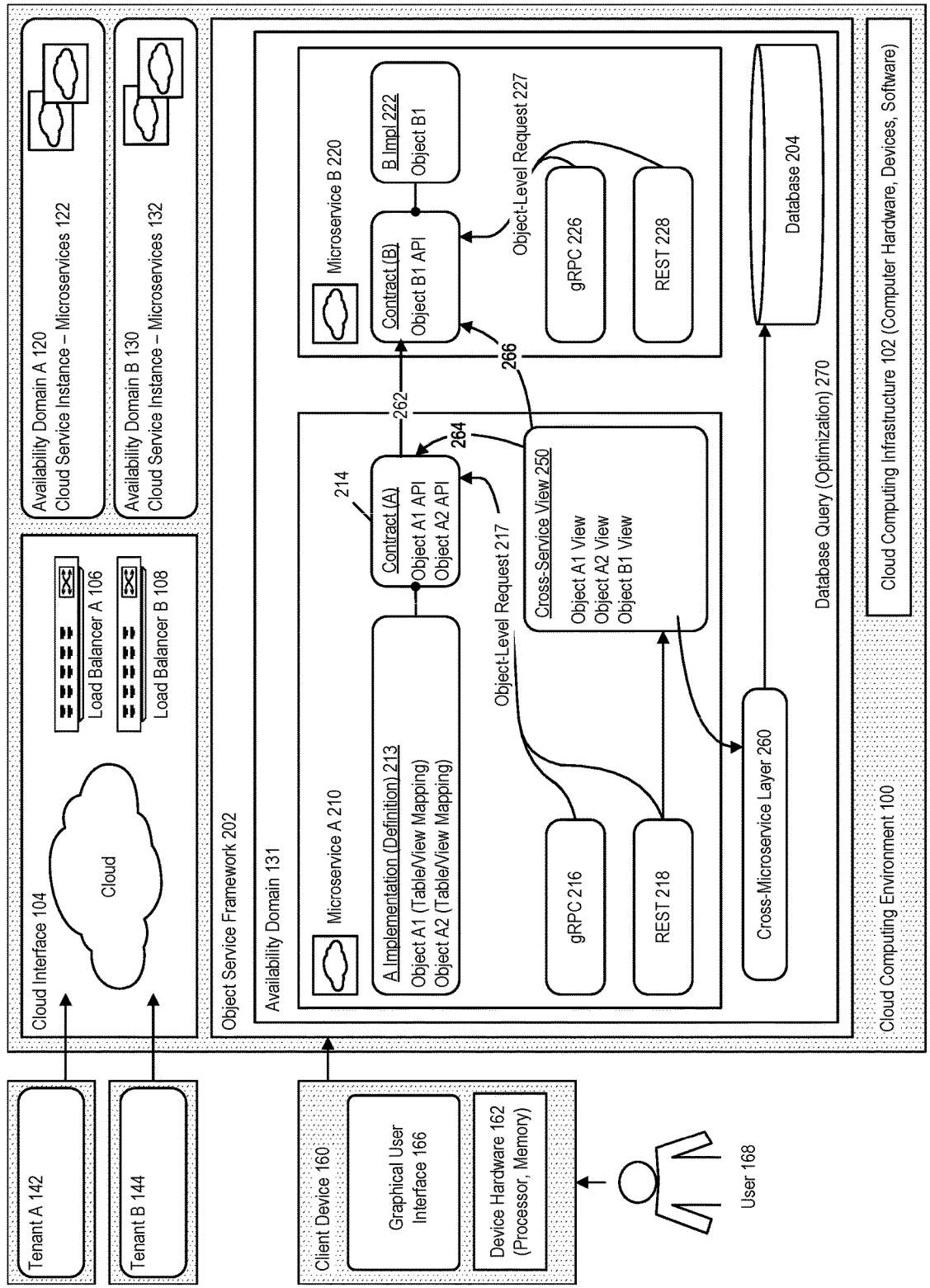
FIG. 6 further illustrates a system for providing cross-microservice query processing in accordance with an embodiment.

FIG. 6 further illustrates a system for providing cross-microservice query processing in accordance with an embodiment.

As illustrated in FIG. 6, in accordance with an embodiment, the collective views associated with the microservices and their objects are used to populate (262, 264, 266) a cross-service view 250 into the database, an example of which is illustrated in Example 1 below, in accordance with an embodiment, wherein the cross-service view is used in processing an object-level query.

Figure 7:
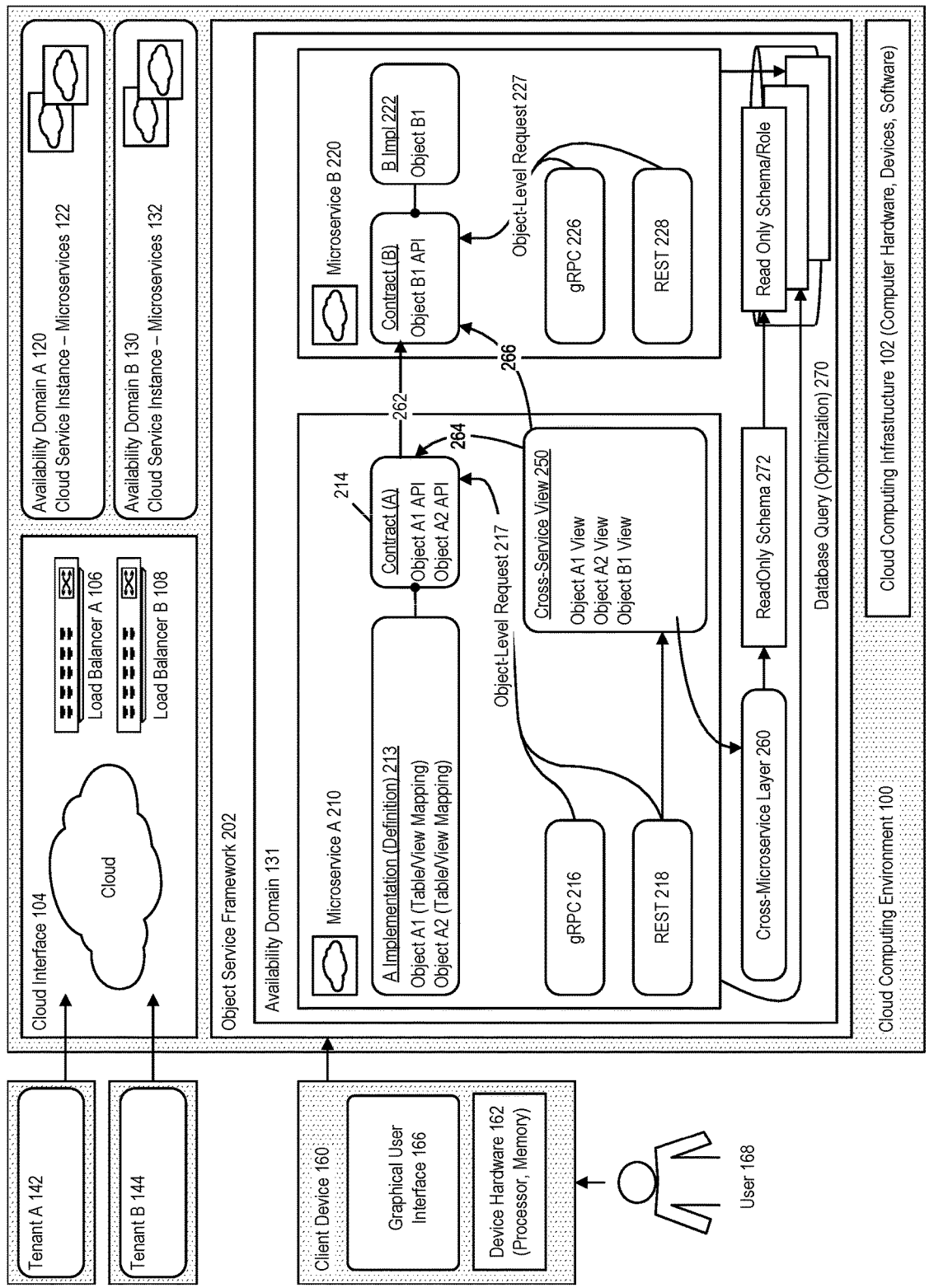
FIG. 7 further illustrates a system for providing cross-microservice query processing in accordance with an embodiment.

FIG. 7 further illustrates a system for providing cross-microservice query processing in accordance with an embodiment.

As illustrated in FIG. 7, in accordance with an embodiment, each microservice is associated with a database schema or database role, which restricts which database artifacts can be accessed via that role. Different microservices may also interact with each other through business object APIs accessible via REST and gRPC. Such business object APIs provide optimization without remote call latency and the cost of serialization/deserialization.

In accordance with an embodiment, a cross-microservice layer 260 is provided, wherein in response to a query to be joined across a plurality of microservices, the cross-microservice layer receives an object-level query based on the cross-service view, and transforms the query into one or more physical database (e.g., SQL) queries 270, using a read/only schema 272. A native database (e.g., SQL) optimization can then be utilized to process the database query.

In accordance with an embodiment, the cross-microservice layer manages via metadata a catalog of those objects that are supported by the object service framework, including each object's public contract, i.e., how the object can be accessed from outside the environment, and each object's internal implementation, such as which tables and columns it uses.

Additionally, in accordance with an embodiment, the cross-microservice layer provides a runtime that is adapted to receive a request from a client, for example via a REST or gRPC interface, and transform the received request from an object-level query to a physical database (e.g., SQL) query.

For example, in accordance with an embodiment, an optimal query performance can be achieved by the infrastructure transforming a cross-microservice joined query into a single/optimized database SQL query, when the involved microservices share a same database instance.

Figure 8:
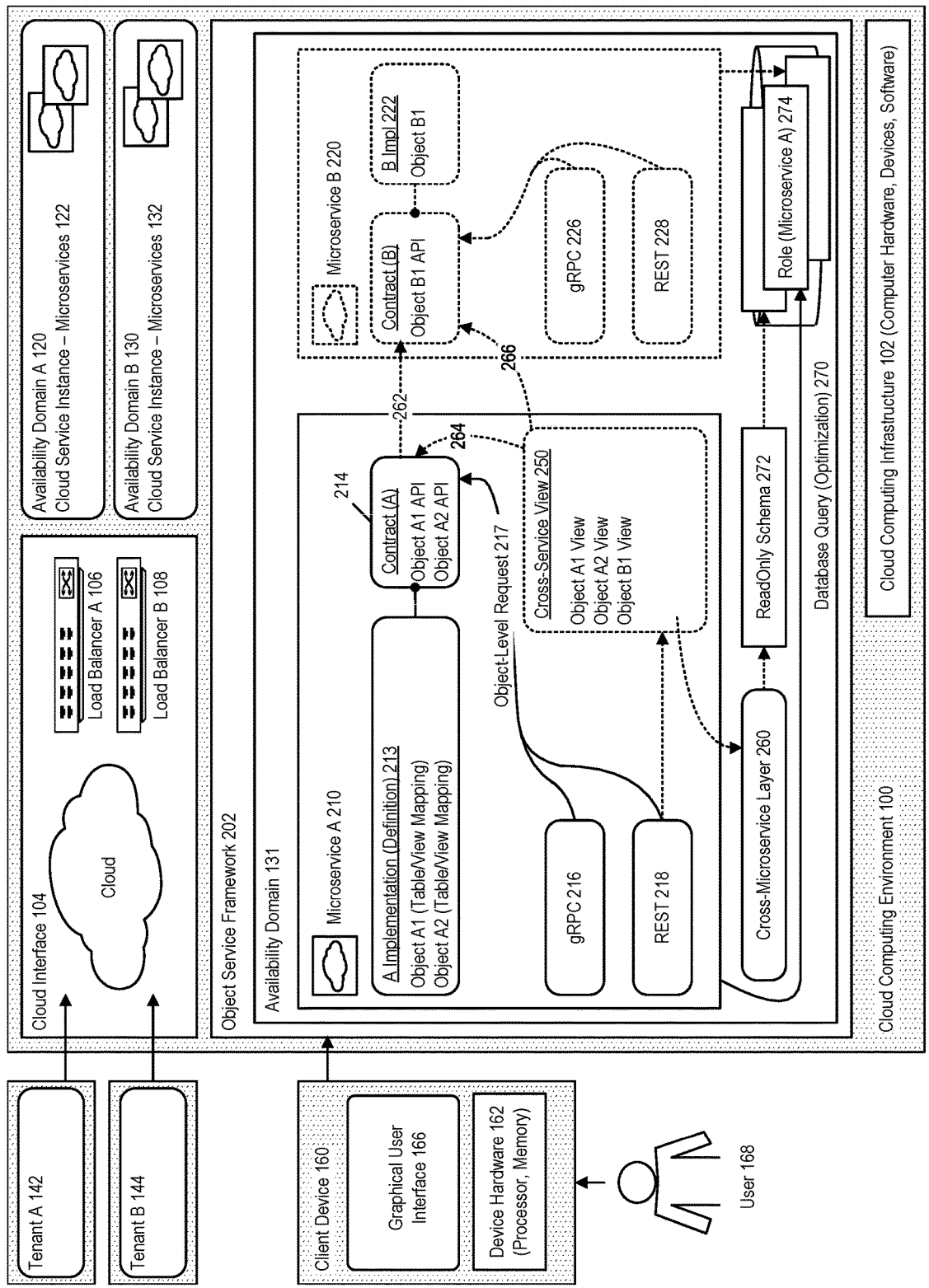
FIG. 8 further illustrates a system for providing cross-microservice query processing in accordance with an embodiment.

FIG. 8 further illustrates a system for providing cross-microservice query processing in accordance with an embodiment.

In accordance with an embodiment, by applying the infrastructure that manages the interactions among microservices and with underlying database, the system makes it possible to leverage a same database cluster among multiple microservices, and at the same time microservice isolation is ensured. Leveraging a single database cluster minimizes the operation cost, instead of forcing each microservice to have its own database instance.

As illustrated in FIG. 8, in accordance with an embodiment, each database artifact is associated with a single/ particular microservice that operates as its owner. Different microservices do not share access to a single database object. This means that a given microservice is restricted from directly accessing those database artifacts that are owned by another microservice.

For example, in accordance with an embodiment, a microservice A may be associated with a database schema or database role 274 which restricts which database artifacts can be accessed via that role (by microservice A).

Figure 9:
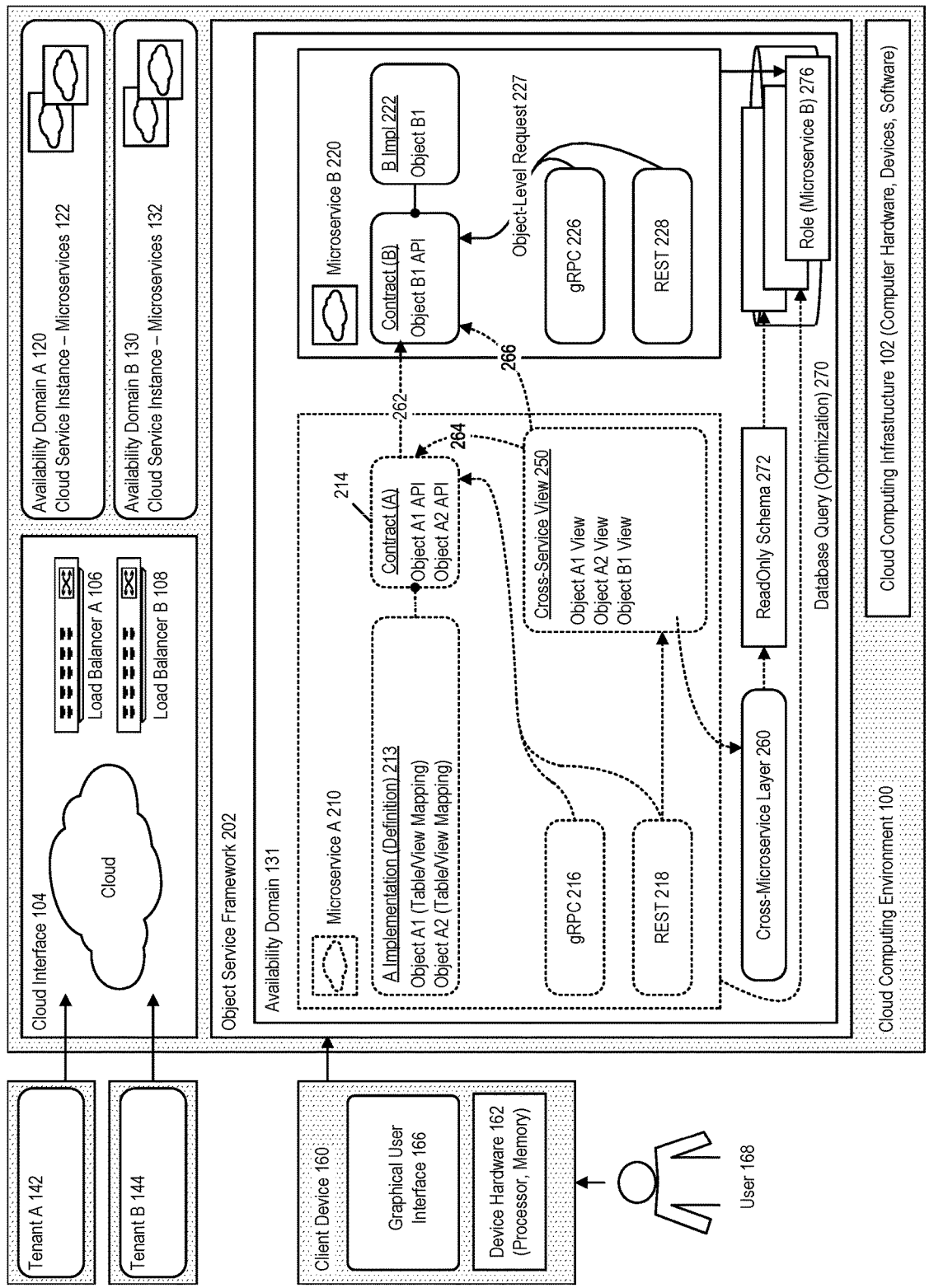
FIG. 9 further illustrates a system for providing cross-microservice query processing in accordance with an embodiment.
Figure 10:
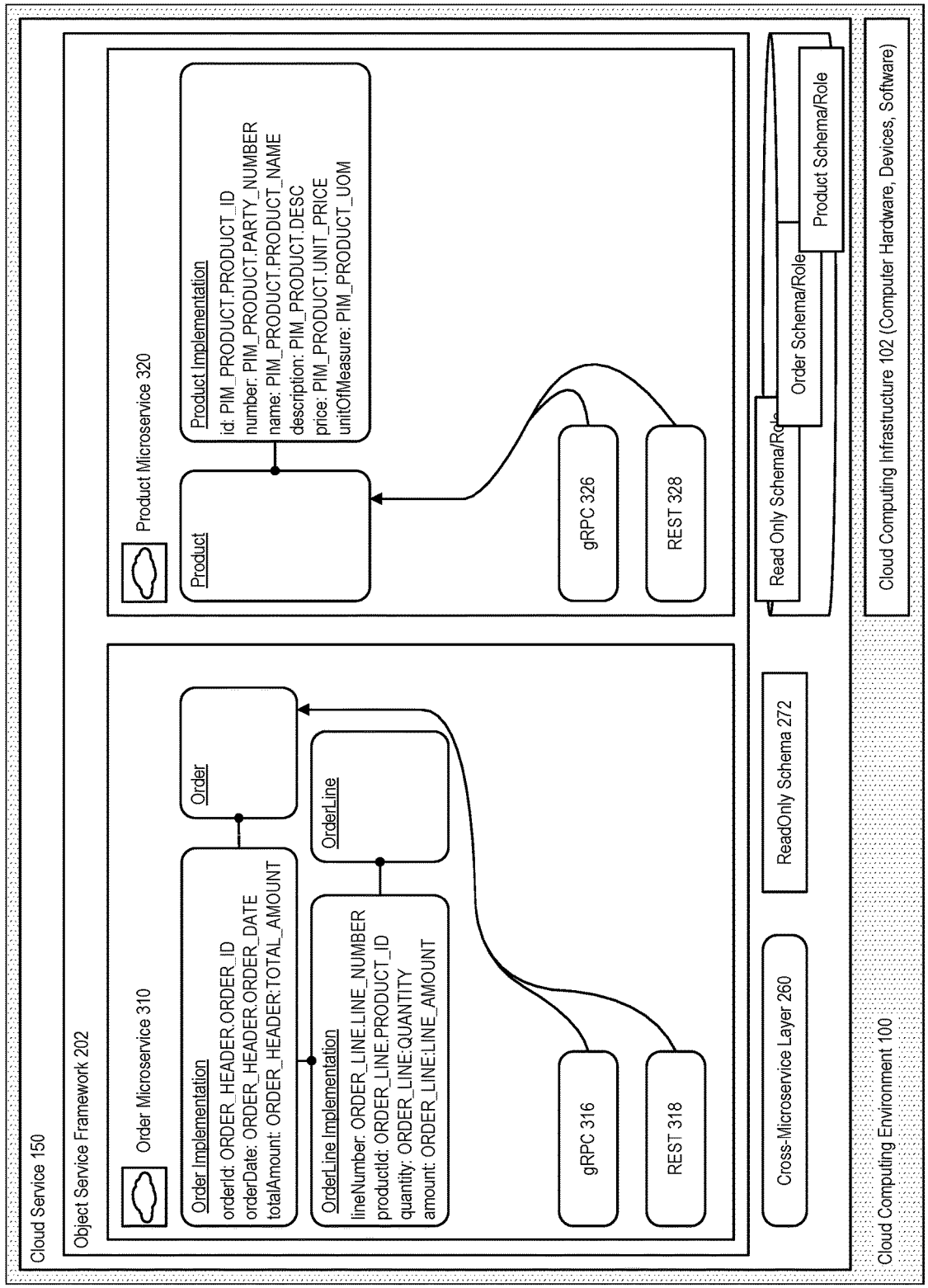
FIG. 10 illustrates an example use of a system for providing cross-microservice query processing in accordance with an embodiment.
Figure 11:
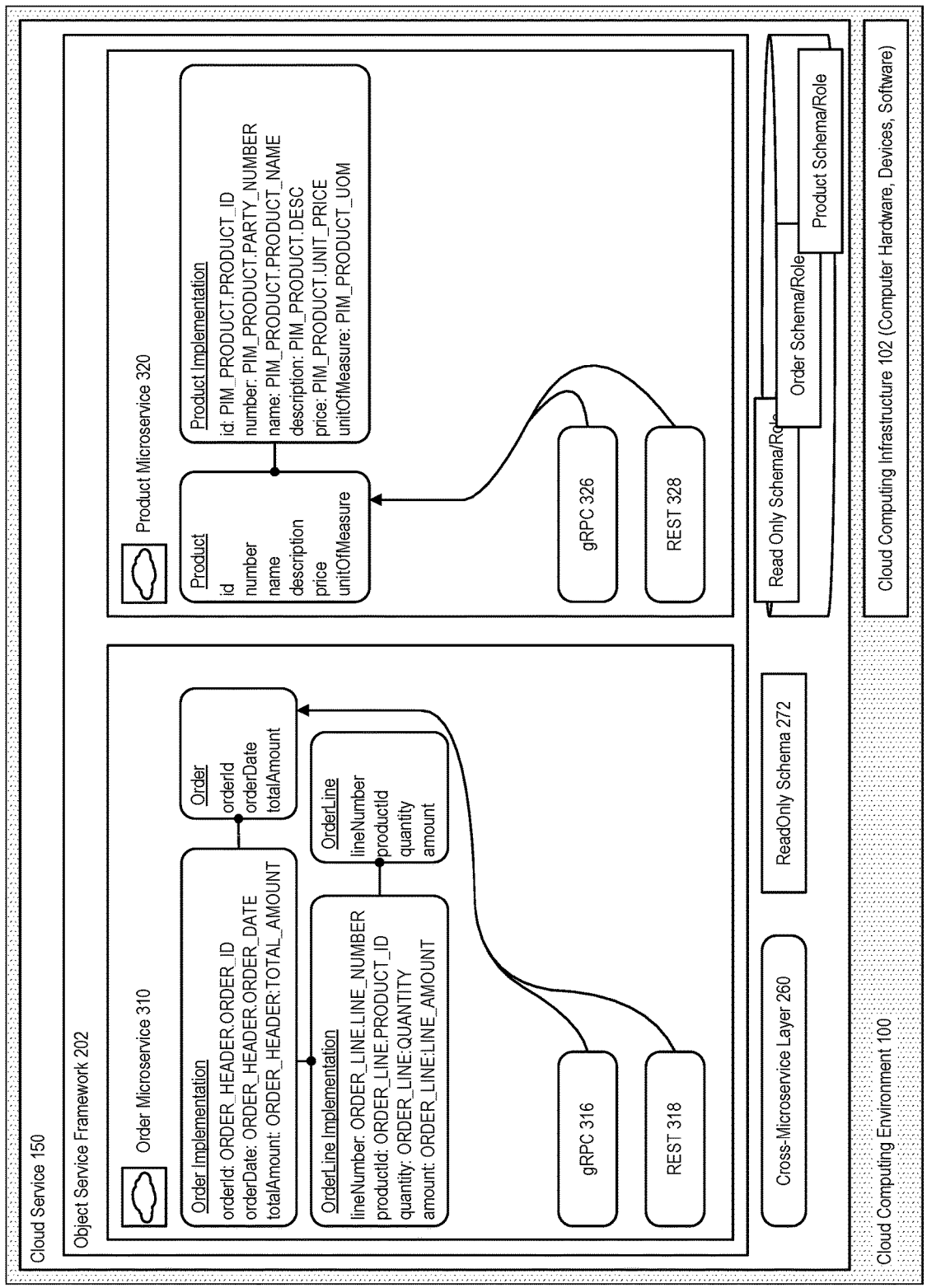
FIG. 11 further illustrates an example use of a system for providing cross-microservice query processing in accordance with an embodiment.
Figure 12:
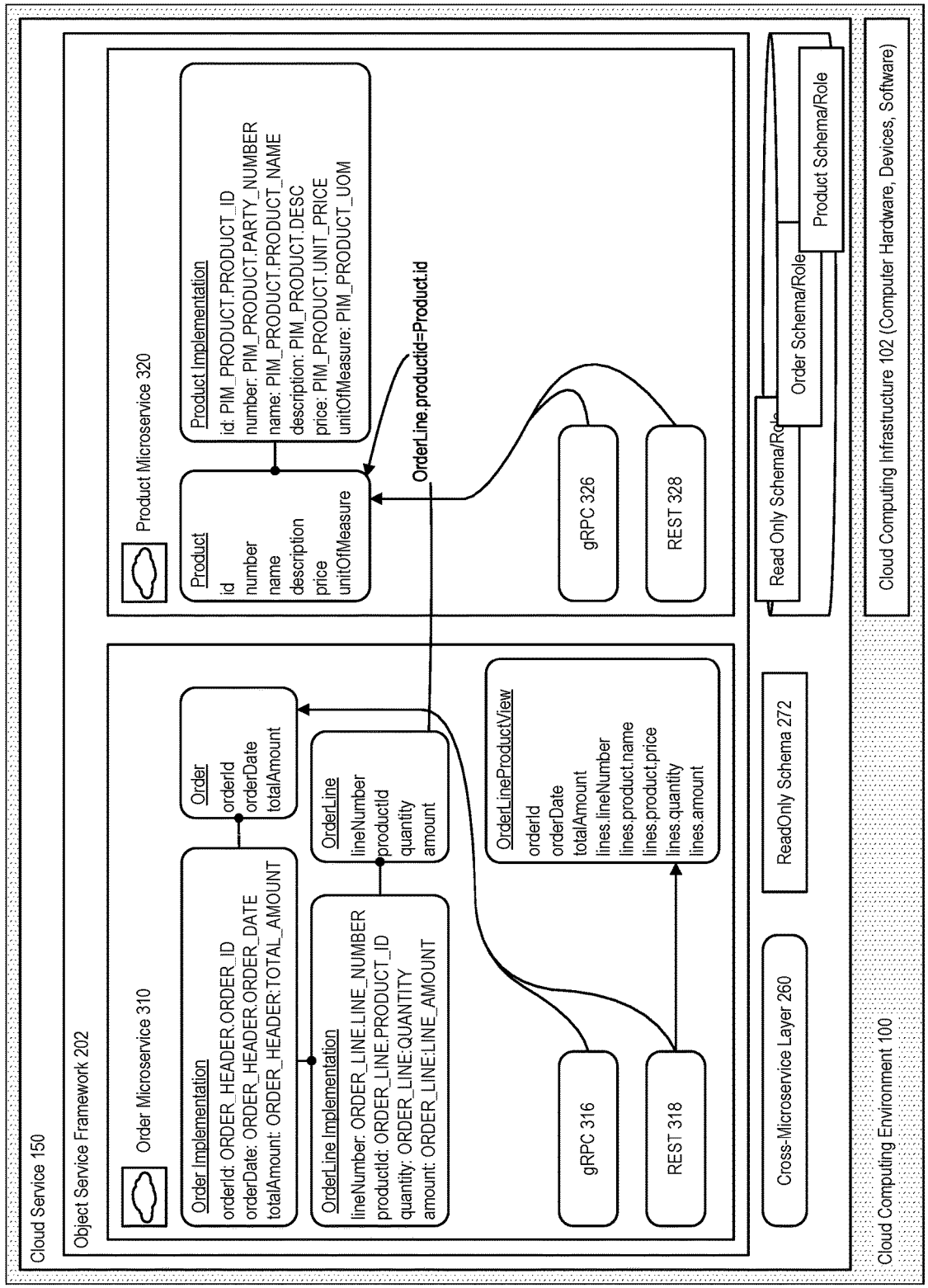
FIG. 12 further illustrates an example use of a system for providing cross-microservice query processing in accordance with an embodiment.
Figure 13:
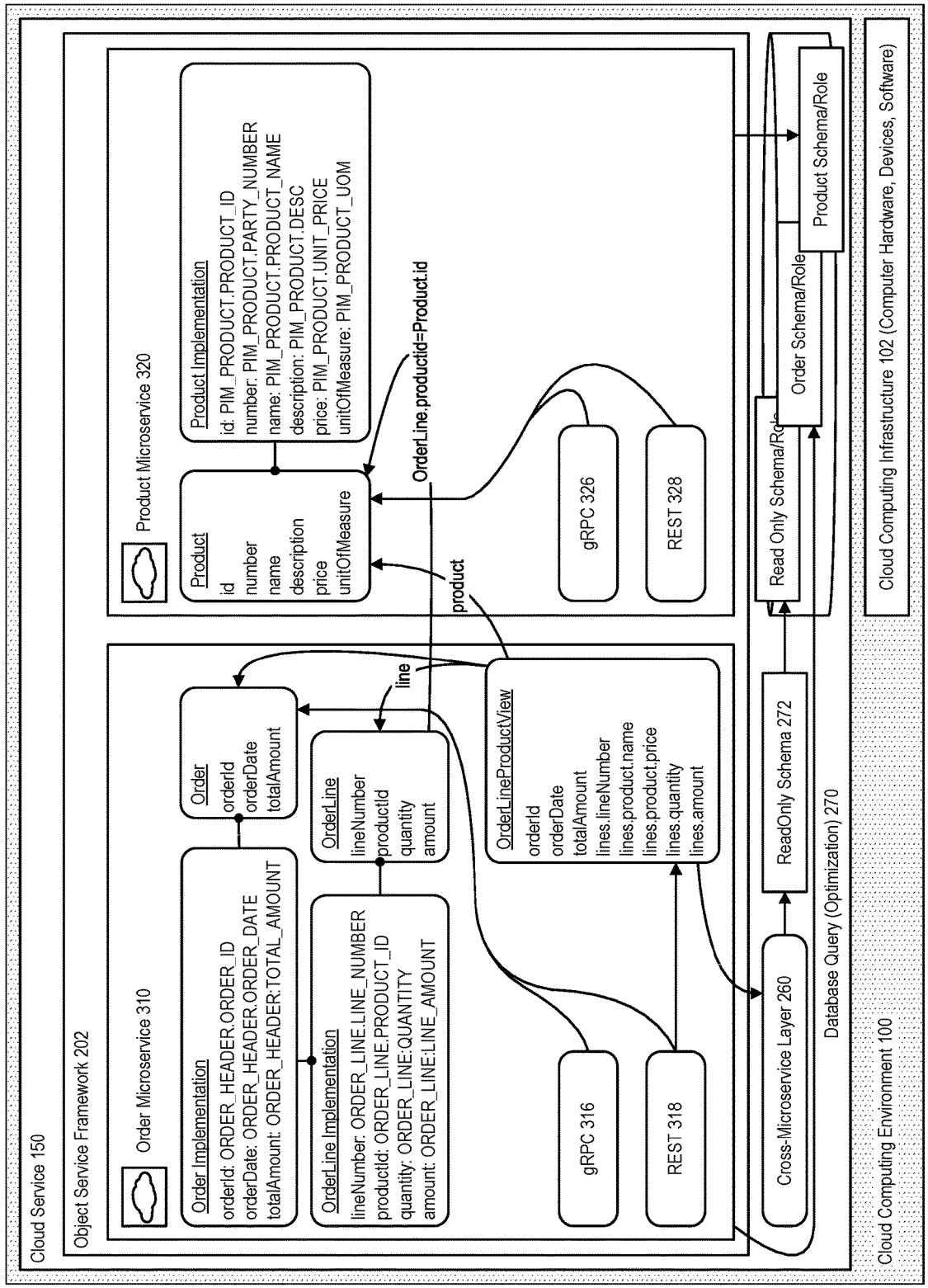
FIG. 13 further illustrates an example use of a system for providing cross-microservice query processing in accordance with an embodiment.

FIG. 9 further illustrates a system for providing cross-microservice query processing in accordance with an embodiment.

For example, in accordance with an embodiment, a microservice B may be associated with a database schema or database role 276 which restricts which database artifacts can be accessed via that role (by microservice B).

As described above, in accordance with an embodiment, when the cross-microservice layer is used in response to a query to be joined across a plurality of microservices, the cross-microservice layer can receives an object-level query based on the cross-service view, and transform the query into one or more physical database (e.g., SQL) queries that span the data otherwise independently owned by the various microservices.

In accordance with an embodiment, the system provides flexibility for a microservice to change its database strategy, without the need of rewriting existing code, and without sacrificing functionality or performance, especially joined queries involving multiple microservices. The system can leverage well-established database SQL optimizations, and extend the use of those to a microservice environment.

Example Use

FIGS. 10-13 illustrate an example use of a system for providing cross-microservice query processing in accordance with an embodiment.

As illustrated in FIGS. 10-13, in accordance with an embodiment, each other microservice (for example, an order microservice 310, and product microservice 32) can be similarly deployed and evolve independently, including having their own microservice implementations that are exposed via REST 318, 328 and gRPC 316, 326 and accessing artifacts in a database.

In accordance with an embodiment in this example, an object-level query can be made against the order object, using a cross-service view, for example:

```
{
  "$collection": {
    "filter": "totalAmount>1000 or lines.product.price>10"
  },
  "orderId": true,
  "totalAmount": true,
  "lines": {
    "lineNumber": true,
    "amount": true,
    "product": {
      "name": true
    }
  }
}
```

The example JSON illustrated above represents a query to return orders and their lines, with a condition on the order level that the order's totalAmount is greater than 1000 or if it has a line with product's price greater than 10.

In accordance with an embodiment, since the object service framework maintains the business object definition including its table and column mapping, the object service framework is able to transform such query into one or more physical database queries, for example:

```
SELECT o.ORDER_ID, o.TOTAL_AMOUNT FROM ORD_ORDERS o
WHERE TOTAL_AMOUNT>1000 or EXISTS
  (SELECT 1
    FROM ORD_ORDER_LINES l JOIN ORD_PRODUCTS
    p ON l.PRODUCT_ID=p.PRODUCT_ID
    WHERE l.ORDER_ID=o.ORDER_ID AND p.UNIT_PRICE>10);
SELECT l.ORDER_LINE_ID, l.AMOUNT, p.PRODUCT_NAME
FROM ORD_ORDER_LINES l JOIN ORD_PRODUCTS p
ON l.PRODUCT_ID=p.PRODUCT_ID
WHERE l.ORDER_ID IN (:orderIds);
```

In accordance with an embodiment, the system can apply a database query optimization to transform the database queries as illustrated above into one query that returns a JSON document directly, for example:

```
WITH P1 AS (SELECT o.ORDER_ID,
o.TOTAL_AMOUNT FROM ORD_ORDERS o
WHERE TOTAL_AMOUNT>1000 or EXISTS
  (SELECT 1
    FROM ORD_ORDER_LINES l JOIN ORD_PRODUCTS p ON
    l.PRODUCT_ID=p.PRODUCT_ID
    WHERE l.ORDER_ID=o.ORDER_ID AND p.UNIT_PRICE>10))
SELECT JSON_ARRAYAGG(
  JSON_OBJECT(
    'orderId' value t0.orderId,
    'totalAmount' value t0.totalAmount,
    'lines' value (
      SELECT JSON_ARRAYAGG(
        JSON_OBJECT (
          'lineNumber' value t1.ORDER_LINE_ID,
          'amount' value t1.AMOUNT,
          'product' value (
            SELECT JSON_OBJECT (
              'name' value t2.PRODUCT_NAME
            )
            FROM ORD_PRODUCTS t2
            WHERE t2.PRODUCT_ID=t1.PRODUCT_ID
          )
        )
        FROM ORD_ORDER_LINES t1 WHERE
        t1.ORDER_ID=t0.orderId
      )
    )
  )
)
FROM P1 t0;
```

In accordance with an embodiment, since one microservice's schema/role cannot access another microservice's tables/views, a global read only schema/role is used to execute such query. The object service framework automatically switches to this global read only schema/role is only when a join among different microservices is required.

Figure 14:
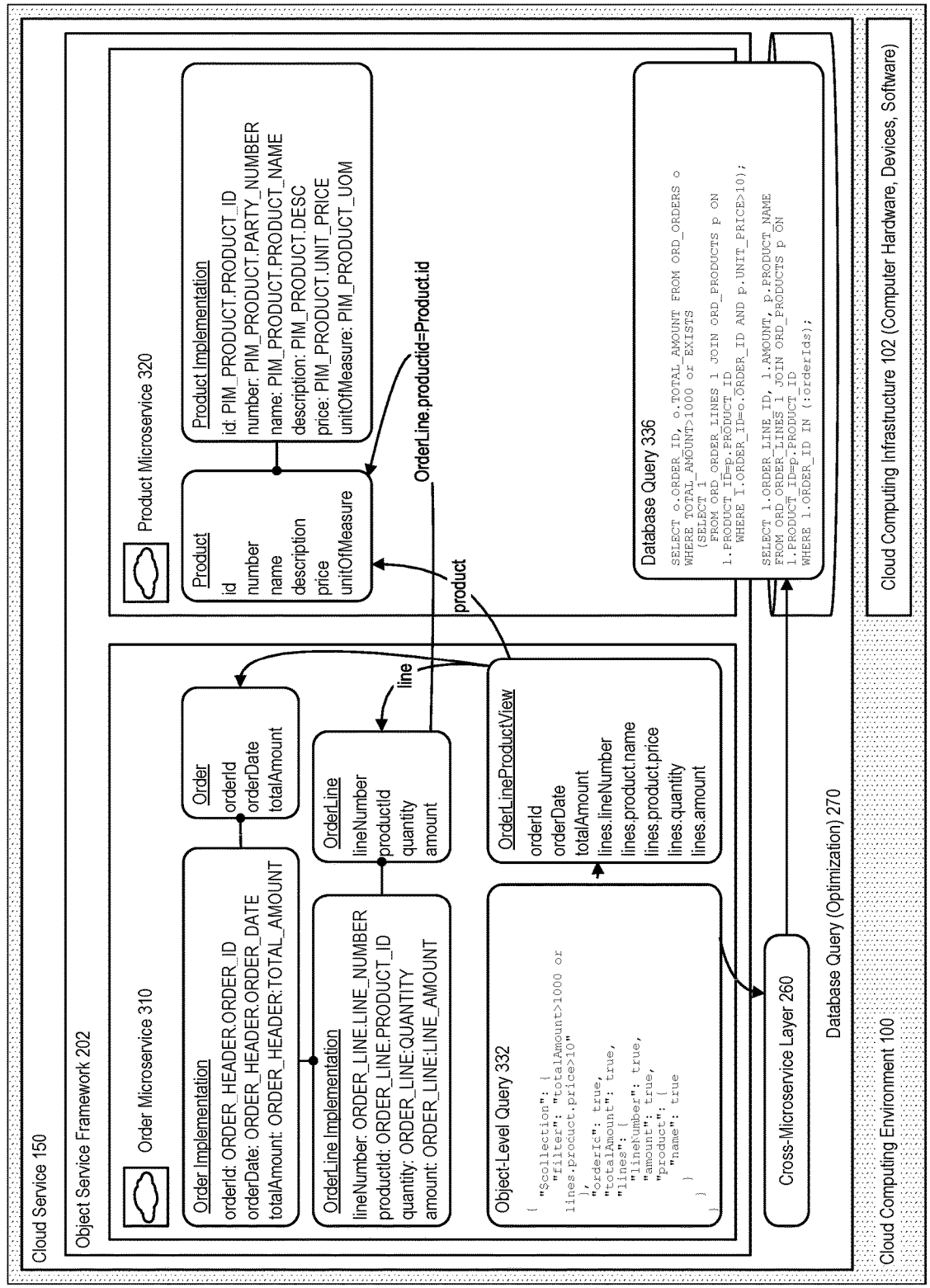
FIG. 14 further illustrates an example use of a system for providing cross-microservice query processing in accordance with an embodiment.

FIG. 14 further illustrates an example use of a system for providing cross-microservice query processing in accordance with an embodiment.

As illustrated in FIG. 14, in accordance with an embodiment, the system enables a cross-service view 332 to be used in processing an object-level request or query (for example as illustrated in Example 1 above), and preparing a database query 336 (for example as illustrated in Examples 2 and 3 above); including the use of an available database query optimization where appropriate.

Cross-Microservice Query Process

Figure 15:
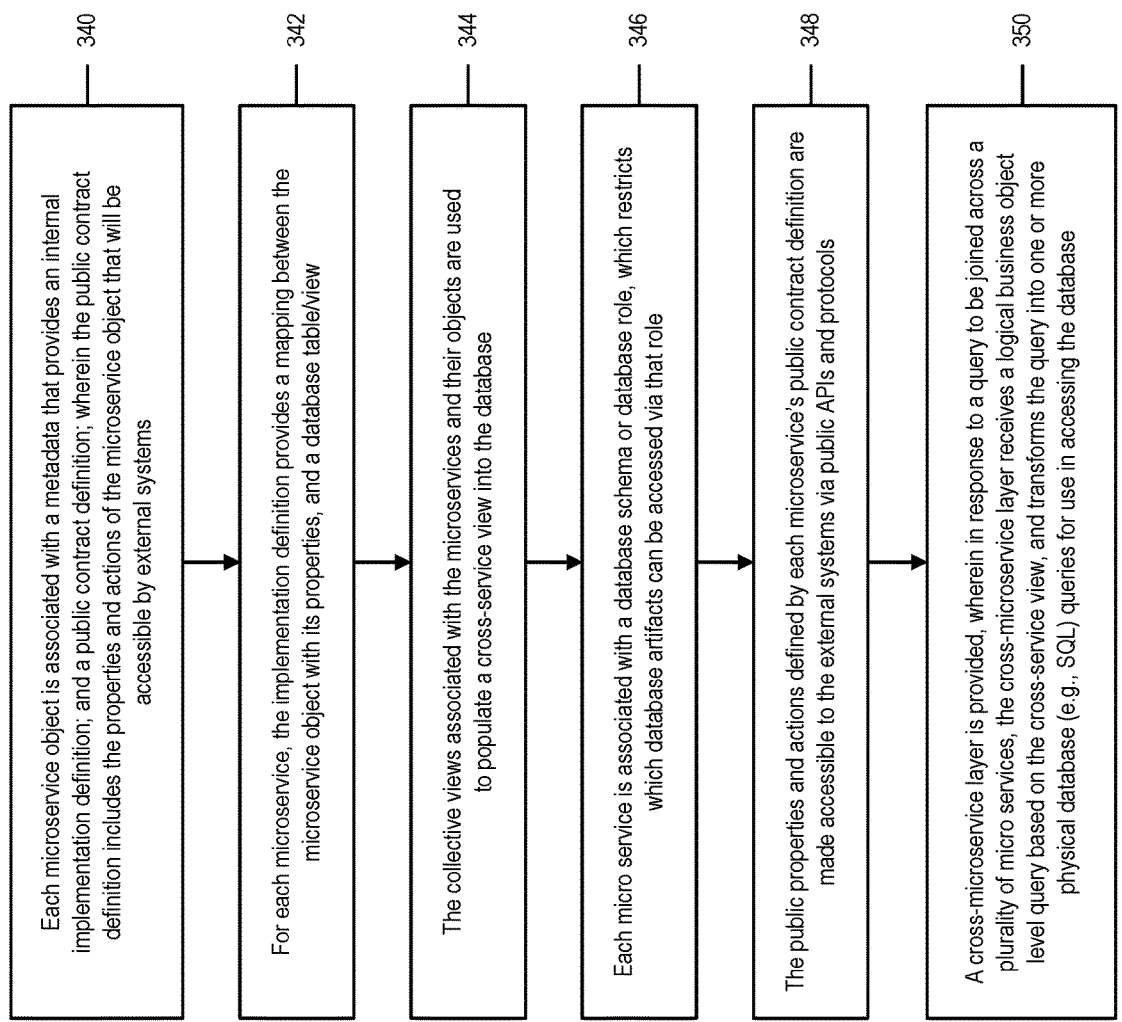
FIG. 15 illustrates a method for providing cross-microservice query processing in accordance with an embodiment.

FIG. 15 illustrates a method for providing cross-microservice query processing in accordance with an embodiment.

As illustrated in FIG. 15, in accordance with an embodiment, at step 340, each microservice object is associated with a metadata that provides (a) an internal implementation definition; and (b) a public contract definition; wherein the public contract definition includes the properties and actions of the microservice object that will be accessible by external systems.

At step 342, for each microservice, the implementation definition provides a mapping between the microservice object with its properties, and a database table/view including, for example, tables, columns, and where appropriate other validation or derivation business logic.

At step 344, the collective views associated with the microservices and their objects are used to populate a cross-service view into the database.

At step 346, each microservice is associated with a database schema or database role, which restricts which database artifacts can be accessed via that role.

At step 348, the public properties and actions defined by each microservice's public contract definition are made accessible to the external systems via public APIs and protocols such as, for example, REST, and gRPC.

At step 350, a cross-microservice layer is provided, wherein in response to a query to be joined across a plurality of microservices, the cross-microservice layer receives an object-level query based on the cross-service view, and transforms the query into one or more physical database (e.g., SQL) queries. A native database SQL optimization can then be utilized to achieve the desired query optimization.

In accordance with various embodiments, the teachings herein may be conveniently implemented using one or more conventional general purpose or specialized computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the teachings herein can include a computer program product which is a non-transitory computer readable storage medium (media) having instructions stored thereon/in which can be used to program a computer to perform any of the processes of the present teachings. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description has been provided for the purposes of illustration and description. It is not intended to be exhaustive or to limit the scope of protection to the precise forms disclosed. Many modifications and variations will be apparent to the practitioner skilled in the art.

The embodiments were chosen and described in order to best explain the principles of the present teachings and their practical application, thereby enabling others skilled in the art to understand the various embodiments and with various modifications that are suited to the particular use contemplated. It is intended that the scope be defined by the following claims and their equivalents.

What is claimed is:

1. A system for providing cross-microservice query processing, comprising:
    a computer including one or more processors that provides a cloud computing environment, together with a plurality of microservices operating thereon;
    an object service framework for use with the microservices and a database, wherein, for each microservice of the plurality of microservices, a microservice object provides;
        an internal implementation definition that provides a mapping between the microservice and a database table view; and
        a public contract definition that includes properties and actions of the microservice object that will be accessible by external systems;
        wherein views associated with the plurality of microservices and their objects are used to populate a cross-service view into the database;
        wherein a catalog of the microservice objects are managed via metadata including, for each microservice object, the public contract that defines how the object can be accessed and the object's internal implementation including database tables used by the object; and
    wherein in response to a query based on the cross-service view, the query is transformed into one or more database queries directed to database tables that are associated with the microservices including, in response to a query to be joined across two or more of the microservices, receiving an object-level query based on the cross-service view, and transforming the query into one or more database queries that span data independently owned by the two or more microservices.

2. The system of claim 1, wherein an object service framework operates to automatically transform queries that join objects in different microservices into a single database query that is optimized for use with the database.

3. The system of claim 2, wherein the object service framework is accessible as a cloud service that supports the use of loosely-coupled but related microservices.

4. The system of claim 1, wherein an object-level query based on the cross-service view transforms a query into one or more database SQL queries that span the data otherwise independently owned by the various microservices.

5. The system of claim 1, wherein the plurality of microservices are loosely-coupled but related in that they interoperate together or require access to each other's data in order to process object-level requests or queries.

6. The system of claim 1, wherein in response to a query a first microservice's schema role cannot access another second microservice's tables or views, a global read only schema role is used to execute the query, wherein the object service framework automatically switches to the global read only schema role when a join among the microservices is required.

7. The system of claim 1, wherein a public contract definition includes properties and actions of the microservice object that will be accessible by external systems via public APIs and protocols, wherein the object definitions operate as a repository for discovery purposes, and wherein for each microservice the implementation definition provides a mapping between the microservice object with its properties, and its database table view.

8. The system of claim 1, wherein each microservice is associated with a database schema and role, which determines database artifacts that can be accessed via that schema and role, or that restricts which database artifacts can be accessed via that role.

9. The system of claim 1, wherein each microservice is associated with a database schema and role, which determines database artifacts that can be accessed via that schema and role, or that restricts which database artifacts can be accessed via that role.

10. A method for providing cross-microservice query processing, comprising:
providing, at a computer including one or more processors, a cloud computing environment and a plurality of microservices operating thereon;
providing an object service framework for use with the microservices and a database, wherein, for each microservice of the plurality of microservices, a microservice object provides:
an internal implementation definition that provides a mapping between the microservice and a database table view; and
a public contract definition that includes properties and actions of the microservice object that will be accessible by external systems;
wherein views associated with the plurality of microservices and their objects are used to populate a cross-service view into the database;
managing via metadata a catalog of objects including, for each microservice object, the public contract that defines how the object can be accessed and the object's internal implementation including database tables used by the object; and
in response to a query based on the cross-service view, transforming the query into one or more database queries directed to database tables that are associated with the microservices including, in response to a query to be joined across two or more of the microservices, receiving an object-level query based on the cross-service view, and transforming the query into one or more database queries that span data independently owned by the two or more microservices.

11. The method of claim 10, wherein an object service framework operates to automatically transform queries that join objects in different microservices into a single database query that is optimized for use with the database.

12. The method of claim 11, wherein the object service framework is accessible as a cloud service that supports the use of loosely-coupled but related microservices.

13. The method of claim 10, wherein an object-level query based on the cross-service view transforms a query into one or more database SQL queries that span the data otherwise independently owned by the various microservices.

14. The method of claim 10, wherein the plurality of microservices are loosely-coupled but related in that they interoperate together or require access to each other's data in order to process object-level requests or queries.

15. The method of claim 10, wherein in response to a query a first microservice's schema role cannot access another second microservice's tables or views, a global read only schema role is used to execute the query, wherein the object service framework automatically switches to the global read only schema role when a join among the microservices is required.

16. The method of claim 10, wherein a public contract definition includes properties and actions of the microservice object that will be accessible by external systems via public APIs and protocols, wherein the object definitions operate as a repository for discovery purposes, and wherein for each microservice the implementation definition provides a mapping between the microservice object with its properties, and its database table view.

17. A non-transitory computer readable storage medium having instructions thereon, which when read and executed by a computer including one or more processors cause the computer to perform a method comprising:
providing, at a computer including one or more processors, a cloud computing environment and a plurality of microservices operating thereon;
providing an object service framework for use with the microservices and a database, wherein, for each microservice of the plurality of microservices, a microservice object provides:
an internal implementation definition that provides a mapping between the microservice and a database table view; and
a public contract definition that includes properties and actions of the microservice object that will be accessible by external systems;
wherein views associated with the plurality of microservices and their objects are used to populate a cross-service view into the database;
managing via metadata a catalog of objects including, for each microservice object, the public contract that defines how the object can be accessed and the object's internal implementation including database tables used by the object; and
in response to a query based on the cross-service view, transforming the query into one or more database queries directed to database tables that are associated with the microservices including, in response to a query to be joined across two or more of the microservices, receiving an object-level query based on the cross-service view, and transforming the query into one or more database queries that span data independently owned by the two or more microservices.

18. The non-transitory computer readable storage medium of claim 17, wherein an object service framework operates to automatically transform queries that join objects in different microservices into a single database query that is optimized for use with the database.

19. The non-transitory computer readable storage medium of claim 17, wherein an object-level query based on the cross-service view transforms a query into one or more database SQL queries that span the data otherwise independently owned by the various microservices.

20. The non-transitory computer readable storage medium of claim 17, wherein the plurality of microservices are loosely-coupled but related in that they interoperate together or require access to each other's data in order to process object-level requests or queries.

* * * * *

UNITED STATES PATENT AND TRADEMARK OFFICE
CERTIFICATE OF CORRECTION

PATENT NO. : 12,298,976 B2
APPLICATION NO. : 18/400573
DATED : May 13, 2025
INVENTOR(S) : Dong et al.

Page 1 of 1

It is certified that error appears in the above-identified patent and that said Letters Patent is hereby corrected as shown below:

In the Claims

In Column 10, Line 13, in Claim 1, delete "provides;" and insert -- provides: --, therefor.

Signed and Sealed this
Twenty-second Day of July, 2025

Coke Morgan Stewart
*Acting Director of the United States Patent and Trademark Office*